June 11, 1940.  G. L. USSELMAN  2,204,166
ELECTRIC CONDENSER
Filed May 3, 1938  2 Sheets-Sheet 1
*Fig. 1*
*Fig. 2*
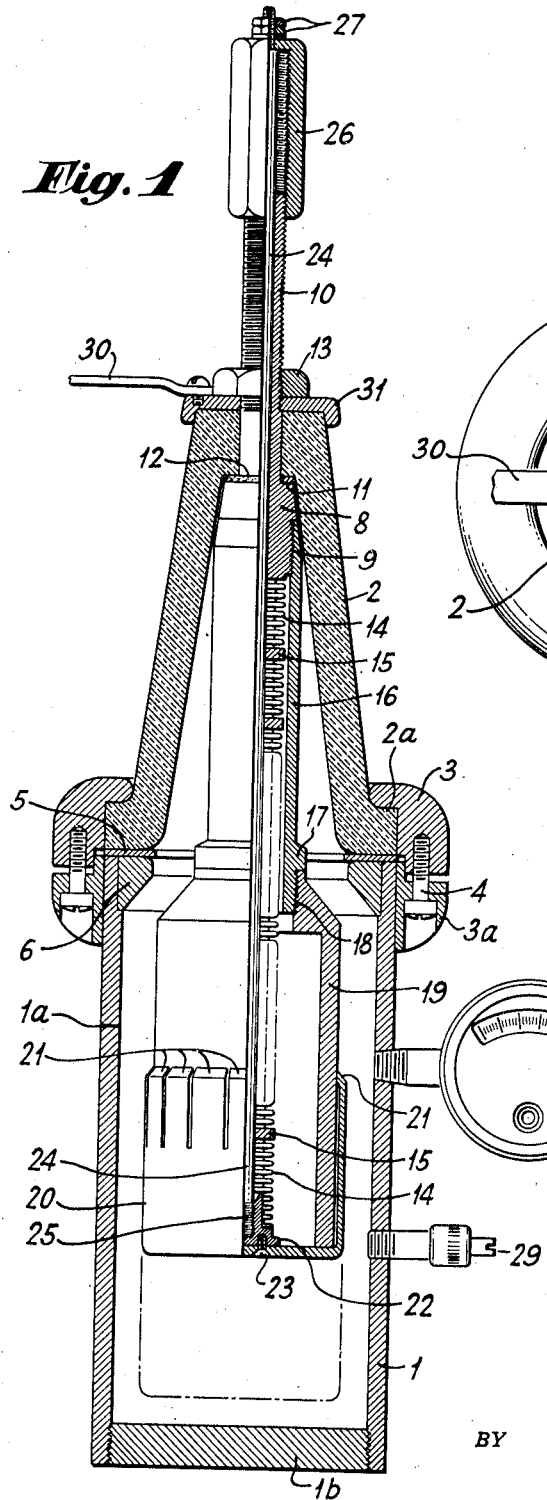
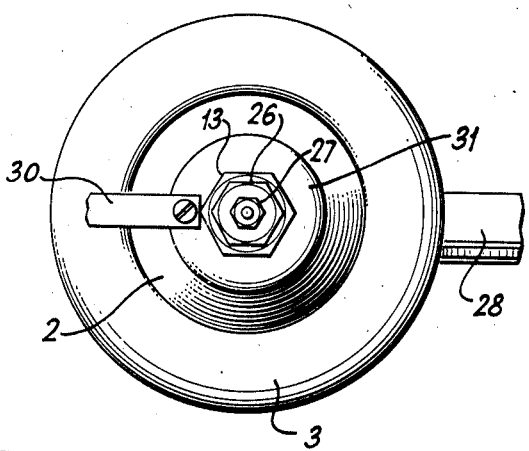
INVENTOR.
GEORGE L. USSELMAN
BY *H. S. Grover*
ATTORNEY.

June 11, 1940.　　　G. L. USSELMAN　　　2,204,166
ELECTRIC CONDENSER
Filed May 3, 1938　　　2 Sheets-Sheet 2

INVENTOR.
GEORGE L. USSELMAN
BY
ATTORNEY.

Patented June 11, 1940

2,204,166

UNITED STATES PATENT OFFICE 2,204,166

ELECTRIC CONDENSER

George Lindley Usselman, Port Jefferson, N. Y., assignor to Radio Corporation of America, a corporation of Delaware Application May 3, 1938, Serial No. 205,675

18 Claims. (Cl. 175—41.5)

This invention relates to a new and novel variable electric condenser and is particularly adapted to use as a neutralizing condenser in a short wave transmitter.

An object of this invention is to simplify and to further improve the compressed fluid type of condenser as is disclosed in the Hansell et al. Patent #2,192,062, patd. Feb. 27, 1940.

Another object of this invention is to provide a compressed air condenser with an internal electrode of large surface area, which is adjustable with respect to a fixed electrode.

Still another object of this invention is to provide a compressed air neutralizing condenser which will be compact in size, and has a very low inductive impedance with an extra wide range of capacity variation between the fixed and variable electrodes of the condenser.

A still further object of this invention is to provide a compressed fluid condenser in which a third electrode is provided to act as a filament-to-grid neutralizing capacity.

A feature of this invention is the arrangement of the component parts which provides a neutralizing condenser of comparatively small physical dimensions having a comparatively large amount of adjustment between the fixed and movable electrodes.

Another feature of this invention is an arrangement whereby a rugged condenser structure is provided in which the flexible metallic member or bellows section extends substantially within the insulator and has associated therewith external means for changing the capacity of the condenser.

Still another feature of this invention is that the physical dimensions of the condenser may be made as nearly as practical with the physical dimensions and electrical characteristics of either one or two RCA 846 transmitting tubes, used in a short wave neutralizing circuit, so that the capacity and inductance of the condenser substantially balances or neutralizes the coupling between the input and the output circuit of an amplifier over a large range of frequencies.

This invention will be more completely understood by referring to the accompanying drawings, in which:

Fig. 1 is a sectional view of a compressed fluid type of condenser having a substantially large range of adjustment;

Fig. 2 is a plan view of Fig. 1;

Figure 4:
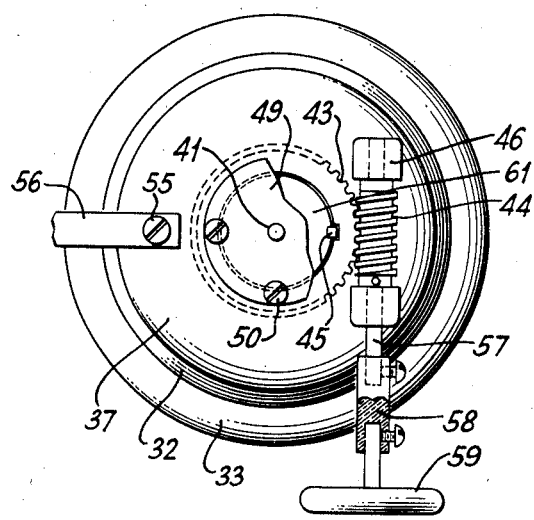
Fig. 4 is a plan view of Fig. 3.

Referring now in detail to Figs. 1 and 2 of the drawings, the fixed condenser electrode comprises a metallic casing 1 which may be of any suitable configuration, but is preferably of tubular shape, and is composed of a low resistance material, such as for example, copper. The inside surface 1a is accurately finished to remove all rough spots which give rise to brushing when the condenser is subjected to high voltage. A cover 1b screwed and soldered into casing 1 completely closes the bottom of casing 1. Fixed electrode 1 is normally connected to and compares with the physical dimensions of the tube anode of a transmitter. Located on the upper portion of casing 1 is a cone-like insulator 2 which is of high grade insulating material, such as Isolantite, steatite, Pyrex, or any suitable material having the necessary and requisite mechanical strength and insulating qualities. The lower portion of insulator 2 has an enlarged section or shoulder portion 2a over which two metallic rings 3 and 3a securely fasten the insulator to casing 1 by means of solder and a plurality of screws 4. A gasket 5 of some suitable material, for example lead, is provided to prevent breakage of the insulator and acts to furnish a gas-tight seal between members 1 and 2. A tapered ring-like member 6 is driven in and soldered at the upper end of casing 1 to provide a bearing surface of insulator 2. The aperture in ring 6 must be made large enough to allow cup member 20 to pass through. Located centrally within insulator 2 is a hollow stud-like member 8 having threaded portions 9 and 10 and shoulder portion 11. This member 8 is secured with a gasket 12 to the upper portion of insulator 2 by means of a threaded nut 13. A flexible section comprising a plurality of flexible metallic bellows 14 is soldered to the lower end of member 8 at a point where threads 9 begin, these flexible bellows are each joined together by means of a plurality of interposed washers 15 which are soldered to the ends of bellows 14. Surrounding the threaded portion 9 of member 8 is a long narrow tubular member 16 having a shoulder portion 17 and threaded portion 18 to which is fastened a skirt 19. The lower end of skirt 19 is fitted with a slotted cup-like member 20 which slides vertically with a spring-like tension provided by means of slots 21. The cup-shaped member 20 is fastened to flanged member 22 by a plurality of screws 23. The lower end of one of the bellows 14 is soldered to flanged member 22. Passing through stud 8 is a relatively long slender rod 24, the lower end of which is threaded at 25 into member 22. The upper end of rod 24 is turned down to a shoulder. The diameter of the smaller portion passes through a slightly larger aperture in an adjusting nut 26 to permit its rotating, thus ensuring vertical movement of member 26. Rod 24 is secured thereto but not locked by means of two lock nuts 27 which are locked only against each other to prevent rotation due to vibration, etc. This arrangement allows the adjusting nut 26 to turn freely and either pull the rod 24 up or push it down for the desired capacity adjustment. In the side wall of casing 1, there is provided a pressure gauge 28 and filling valve 29. A connecting strip 30 is shown bolted to the part 31. This is the condenser terminal for the inner electrode. The terminal for the outer electrode may be attached to any desirable point on part 1.

Figure 3:
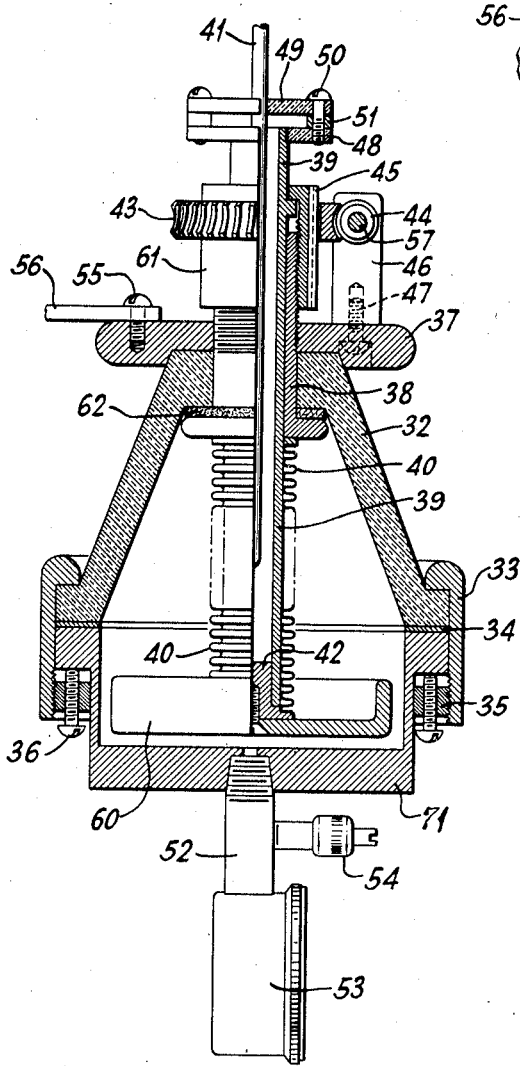
Fig. 3 is a sectional view of a compressed fluid type of condenser wherein the metallic casing or fixed electrode is comparatively small with respect to the insulating portion. This condenser also has a comparatively large range of capacity adjustment.

Referring now to the modification shown in Figs. 3 and 4, the fixed electrode 71 which forms the main body of the condenser is secured to an insulator 32, by means of clamp ring 33, gasket 34 and threaded ring 35. A plurality of clamping screws 36 serves to clamp members 32, 33, 34 and 35 in locking engagement. A corona shield 37 is fastened to the upper portion of insulator 32 by means of a shouldered stud-like member 38 and is made air-tight by gasket 62. The condenser is made air-tight by metal bellows 40. A hollow stem 39 passes through member 38 and serves as a guide for flexible metallic bellows section 40, stem 39 also serving as a tubular sliding member to vary the capacity of the condenser by means of an inner electrode 60 which is fitted by means of a member 42 to the lower end of member 39. Member 61 is rotated by means of a spiral gear 43 and worm gear 44 through key 45. Bracket 46 supports worm gear 44 on top of shield 37 by means of screws 47. The upper end of member 39 is threaded to receive a support 48 to which an insulating plate 49 is secured by means of a plurality of screws 50 and spacing member 51. A metallic rod 41 is slidably and frictionally supported by insulator 49 and together with hollow stem 39 simulates the tube filament capacity, thus forming a third electrode for the condenser. A combination inlet device 52 connects a pressure gauge 53 and filling valve 54. Suitable electric connections are made by means of stud 55 connected by a bus bar 56. The other electrical connection may be made to any suitable point on part 71. Worm 44 is usually connected by means of a shaft 57 and to insulate the latter from dangerous voltages and to prevent grounding of the alternating current excitation voltages to which the condenser is subjected, an insulator 58 is interposed between shaft 57 and control knob 59.

While only a few modifications of this invention have been described in the specification, it is to be distinctly understood that condensers of this type are capable of other modifications and this invention should not be limited to the precise embodiment shown.

The operation of the condensers shown in Figs. 1, 2, 3 and 4 is similar to that shown in Hansell et al. Patent #2,192,062, except that these condensers have over two times the percentage of variable capacity range. This is made possible by the extra long sealing bellows which allows comparatively large movement of the inner electrode without danger of injuring the bellows, and by the comparatively large size and shape of the movable portion of the inner electrode. The current to the inner electrode of the embodiment shown by Figs. 3 and 4 is carried by metal bellows 40. The metal bellows in the embodiment shown by Figs. 1 and 2 does not carry current but the current for the inner electrode is carried over sleeve 16 and skirt 19. The current to cup electrode 20 passes over the sliding contacts 21 which are firm and close fitting. In Fig. 1 no dependence is placed on the air pressure to insure outward movement of cup 20 but push rod 24 is threaded onto part 22 at one end and secured for rotation to part 26 at the upper end so that adjustment nut 26 positively moves the cup 20 up and down as desired. Part 31 may also be made in the shape of a suitable corona shield. In the embodiment shown by Figs. 3 and 4, the parts 39 and 41 form electrodes of a condenser which may be used in a suitable neutralizing circuit to balance out the detrimental effects of filament-grid capacity on the operation of a stage.

What is claimed is:

1. A variable condenser comprising a fixed electrode and two adjustable electrodes, at least one of said adjustable electrodes comprising a fixed support and a movable electrode portion, a tubular flexible metallic member connected between the fixed support and movable electrode portion of said adjustable electrode, and a dielectric of a fluid under pressure interposed between said fixed electrode and at least one of said adjustable electrodes.

2. An electric condenser comprising at least three electrodes, a casing acting as a first electrode for said condenser, a hollow cone-like insulator supported by said casing, a second electrode adjustably secured to said insulator by a plurality of flexible bellows secured to said insulator and said second electrode for permitting variation in the position of said second electrode within said casing, adjusting means to vary the position of said second electrode, the spacing between said first and second electrodes within said casing being filled with a gas under pressure acting as a dielectric for said condenser, and a third electrode insulatingly supported by said second electrode.

3. An electric condenser comprising at least three electrodes, a casing acting as a first electrode for said condenser, a hollow cone-like insulator supported by said casing, a second electrode adjustably secured to said insulator by a plurality of flexible bellows secured to said insulator and said second electrode for permitting variation in the position of said second electrode within said casing, adjusting means to vary the position of said second electrode, the spacing between said first and second electrodes within said casing being filled with a gas under pressure acting as a dielectric for said condenser, and a third rod-like electrode insulatingly supported by said second electrode.

4. An electric condenser comprising a casing having a greater diameter than its length, said casing acting as one electrode of a condenser, a hollow cone-like insulator supported by said casing, a central electrode adjustably secured to said insulator by a plurality of flexible bellows secured to said insulator and said second electrode for permitting variation in the position of said central electrode within said casing, and adjusting means varying the position of said central electrode, the spacing between the electrodes within said casing being filled with a gas under pressure acting as a dielectric for said condenser.

5. An electric condenser comprising a casing having a greater diameter than its length, said casing acting as one electrode of a condenser, a hollow cone-like insulator supported by said casing, a central electrode adjustably secured to said insulator by a plurality of flexible current conducting bellows for permitting variation in the position of said central electrode within said casing, the depth of said casing being small as compared to the length of said insulator, adjusting means varying the distance of said central electrode to the said casing electrode, the spacing between the electrodes within said casing being filled with a gas under pressure acting as a dielectric for said condenser.

6. An electric condenser comprising a casing having a greater diameter than its length, said casing acting as one electrode of a condenser, a hollow cone-like insulator adjustably supported by said casing, a central electrode secured to said insulator by a plurality of flexible metal bellows for permitting movement of said central electrode within said casing, adjusting means supported by said insulator and coupled to said central electrode, said means comprising a worm and a gear meshed together to vary the spacing of said central electrode with respect to the said casing electrode, the space between the electrodes within said casing being filled with a gas under pressure acting as a dielectric for said condenser.

7. An electric condenser comprising at least three electrodes, a casing acting as a first electrode for said condenser, a hollow cone-like insulator adjustably supported by said casing, a second electrode secured to said insulator by a plurality of flexible bellows for permitting variation in the position of said second electrode within said casing, adjusting means to vary the position of said second electrode, the space between said first and second electrodes within said casing and other unoccupied space being filled with a gas under pressure acting as a dielectric for said condenser, and a third electrode insulatingly supported by a disc-like member secured to said second electrode.

8. An electric condenser comprising a shallow casing which acts as one electrode for said condenser, a hollow cone-like insulator supported by said casing whose length is substantially greater than said shallow casing, a shallow central electrode having a fixed support and a movable portion, said movable portion extending within said cone-like insulator to permit a large movement of said fixed portion with respect to said shallow casing, a movable member having means secured to said movable portion to provide a change in position of the movable portion of said central electrode for substantially changing the capacity of said condenser, the space within said condenser being filled with a gas under pressure acting as a dielectric for said condenser.

9. An electric condenser comprising a casing whose diameter is large as compared with its length, a flange surrounding said casing, a hollow cone-like insulator having a shouldered portion, clamping means engaging said flange and shouldered portion of said insulator for clamping them together, a central electrode having a fixed support and a movable portion whose diameter is large as compared with its length to permit a large capacity change with a small movement of a movable member, said movable member having means secured to said movable portion to provide a change in position of the movable portion of said central electrode for substantially changing the capacity of said condenser, the space within said condenser being filled with a gas under pressure acting as a dielectric for said condenser.

10. An electric condenser comprising a shallow casing whose diameter is large as compared with its length which acts as one electrode of said condenser, a hollow cone-like insulator whose diameter is small as compared with its length supported by said casing, a shallow central electrode having a fixed support and a movable portion whose diameter is large as compared with its length, said movable portion extending within said cone-like insulator to permit a large capacity change with a small movement of said movable member by means which is secured to said movable portion to provide a change in position of the movable portion of said central electrode for substantially changing the capacity of said condenser, the space within said casing being filled with a gas under pressure acting as a dielectric for said condenser.

11. An electric condenser comprising a fixed casing electrode, an insulator supported by said casing and having a hollowed out portion, an adjustable electrode comprising a fixed support and a movable electrode portion, a tubular flexible metallic member connected between the fixed support and movable electrode portion of said adjustable electrode, the length of said tubular flexible metallic member being greater than the hollowed out portion of said insulator, and a dielectric of fluid under pressure interposed between said fixed and adjustable electrodes.

12. An electric condenser comprising at least three electrodes, a casing acting as a first electrode for said condenser, a hollow cone-like insulator supported by said casing, a second electrode adjustably secured to said insulator by a plurality of flexible bellows secured to said insulator and said second electrode for permitting variation in the position of said second electrode within said casing, adjusting means to vary the position of said second electrode, the spacing between said first and second electrodes within said casing being filled with a gas under pressure acting as a dielectric for said condenser, and an adjustable third electrode insulatedly supported by said second electrode for varying the capacity therebetween.

13. A condenser especially adapted for high frequency circuits comprising a metallic fixed casing electrode having an opening therein, an insulator located at said opening and carried by said casing, the length of said insulator being substantially greater than that of said casing, a fixed support element located within and carried by said insulator, a first adjustable condenser electrode, a second adjustable condenser electrode, and means passing through said insulator and said fixed support element for carrying said first and second condenser adjustable electrodes and for adjusting their positions with respect to said casing electrode.

14. A condenser especially adapted for high frequency circuits comprising a metallic fixed casing electrode having an opening therein, an insulator located at said opening and carried by said casing, the length of said insulator being substantially greater than that of said casing, a fixed support element located within and carried by said insulator, a first adjustable condenser electrode, a second adjustable condenser electrode, means passing through said insulator and said fixed support element for carrying said first and second condenser adjustable electrodes and for adjusting their positions with respect to said casing electrode, and means outside said casing for independently moving said second adjustable electrode with respect to said first adjustable electrode.

15. A condenser especially adapted for use in high frequency circuits comprising a metallic fixed casing electrode having an opening therein, a conical insulator supported by said casing and having a hollowed out portion, an inner adjustable electrode comprising a fixed support secured to said insulator, a movable electrode portion, a tubular flexible metallic member connected between the fixed support and movable electrode portion, said tubular metallic member having a length greater than that of the hollowed out portion of said conical insulator, said adjustable electrode being supported by said insulator within the cylindrical opening of said casing electrode, and external means for adjusting the length of said inner adjustable electrode.

16. A condenser especially adapted for use in high frequency circuits comprising a metallic casing electrode having an opening therein, an insulator located at said opening and supported by said casing, an inner adjustable electrode supported by said insulator within said opening in said casing electrode, said inner adjustable electrode comprising a metallic bellows section, a fixed sleeve member located within the casing and supported by said insulator, a telescoping sleeve having a plurality of slots surrounding said fixed sleeve member, means for moving said telescoping sleeve by compressing and extending said bellows section to change the capacity of said condenser and the unoccupied space within said casing being filled with a compressed gas acting as a dielectric for said condenser.

17. An electric condenser comprising a casing having a greater diameter than its length, said casing acting as one electrode of said condenser, a flange secured to and surrounding said casing, a hollow cone-like insulator having a shouldered portion, clamping means engaging said flange and said shouldered portion of said insulator for binding them together, a central electrode insulatingly secured to said casing, said central electrode having a fixed support and movable portion, means secured to said movable portion to provide a change in position of the movable portion of said central electrode for substantially changing the capacity of said condenser, the space between the electrodes and other space within said casing being soldered with a gas under pressure acting as a dielectric for said condenser.

18. A variable condenser comprising a fixed electrode and two adjustable electrodes, at least one of said adjustable electrodes comprising a fixed support and a movable electrode portion, a tubular flexible metallic member connected between the fixed support and movable electrode portion of said adjustable electrode, means for moving both adjustable electrodes together, means to move one adjustable electrode independently of the other adjustable electrode, and a dielectric of a fluid under pressure interposed between said fixed electrode and at least one of said adjustable electrodes.

GEORGE LINDLEY USSELMAN.